United States Patent
Ichinose (10) Patent No.: US 11,136,195 B2
(45) Date of Patent: Oct. 5, 2021

(54) HOLDER FOR CONVEYANCE OF CYLINDRICAL BODY

(71) Applicant: SANYO Electric Co., Ltd., Daito (JP)

(72) Inventor: Hiroaki Ichinose, Kadoma (JP)

(73) Assignee: SANYO Electric Co., Ltd., Daito (JP)

( * ) Notice: Subject to any disclaimer, the term of this patent is extended or adjusted under 35 U.S.C. 154(b) by 0 days.

(21) Appl. No.: 16/745,797

(22) Filed: Jan. 17, 2020

(65) Prior Publication Data

US 2020/0148478 A1    May 14, 2020

Related U.S. Application Data

(63) Continuation of application No. 16/360,514, filed on Mar. 21, 2019, now Pat. No. 10,569,958.

(30) Foreign Application Priority Data

Mar. 21, 2018 (JP) ................. 2018-218099

(51) Int. Cl.
*B65G 17/32* (2006.01)
*H01M 10/04* (2006.01)

(52) U.S. Cl.
CPC ........ *B65G 17/32* (2013.01); *H01M 10/0404* (2013.01); *H01M 10/0422* (2013.01); *B65G 2201/0261* (2013.01)

(58) Field of Classification Search
CPC .............. B65G 17/32; H01M 10/0404; H01M 10/0422
USPC ............ 198/803.14, 803.15, 867.11, 867.12; 269/57, 287
See application file for complete search history.

(56) References Cited

U.S. PATENT DOCUMENTS

| | | | | |
|---|---|---|---|---|
| 2,953,970 A | * | 9/1960 | Maynard | G02B 7/00 359/611 |
| 3,320,564 A | * | 5/1967 | Sosey | B23Q 3/1546 335/285 |
| 5,799,934 A | * | 9/1998 | Kouda | B65G 17/32 198/690.1 |
| 5,897,090 A | * | 4/1999 | Smith | B01L 9/06 206/306 |
| 6,068,110 A | * | 5/2000 | Kumakiri | B65G 17/32 198/803.14 |

(Continued)

FOREIGN PATENT DOCUMENTS

| | | |
|---|---|---|
| JP | 8-7855 A | 1/1996 |
| JP | 8-185844 A | 7/1996 |

(Continued)

*Primary Examiner* — Douglas A Hess
(74) *Attorney, Agent, or Firm* — Westerman, Hattori, Daniels & Adrian, LLP (57) ABSTRACT

A holder for conveyance of a cylindrical body includes a tubular portion having a hollow portion in which a cylindrical body is housed, and a protrusion having a base end connected to an inner wall surface of the tubular portion and a distal end formed as a free end. The protrusion has elasticity and flexibility, and the protrusion is disposed on an inner diameter side of an outer circumferential surface of the cylindrical body at an expected housing position such that a side surface of the distal end of the protrusion is allowed to come into contact with the outer circumferential surface while the protrusion is warped to an outer diameter side of the hollow portion.

6 Claims, 9 Drawing Sheets

(56) References Cited

U.S. PATENT DOCUMENTS

| | | | | |
|---|---|---|---|---|
| 6,971,506 | B2* | 12/2005 | Hassinen | G01N 35/04 |
| | | | | 198/803.14 |
| 7,207,359 | B2* | 4/2007 | Duman | B65B 43/52 |
| | | | | 141/129 |
| 7,708,136 | B2* | 5/2010 | Uriel | B65B 43/52 |
| | | | | 198/803.11 |
| 8,011,166 | B2 | 9/2011 | Sheets et al. | |
| 8,047,359 | B2* | 11/2011 | Fellows | B65G 17/002 |
| | | | | 198/867.11 |
| 8,147,778 | B2 | 4/2012 | Pedrazzini | |
| 8,607,961 | B2* | 12/2013 | Ek | B23Q 7/16 |
| | | | | 198/397.04 |
| 8,695,791 | B2* | 4/2014 | Ohman | B65G 47/71 |
| | | | | 198/867.01 |
| 8,777,000 | B2* | 7/2014 | Kramer | B65C 9/04 |
| | | | | 198/867.11 |
| 9,073,695 | B2* | 7/2015 | Lukes | B65G 17/32 |
| 9,133,006 | B2 | 9/2015 | Kelley | |
| 9,844,846 | B2* | 12/2017 | Terzini | B23Q 1/032 |
| 10,278,790 | B2 | 5/2019 | Zieris et al. | |
| 10,569,958 | B1* | 2/2020 | Ichinose | H01M 2/00 |

FOREIGN PATENT DOCUMENTS

| | | |
|---|---|---|
| JP | 9-306453 A | 11/1997 |
| JP | 10-80891 A | 3/1998 |

\* cited by examiner

HOLDER FOR CONVEYANCE OF CYLINDRICAL BODY

CROSS REFERENCE TO RELATED APPLICATION

This is a Continuation of U.S. application Ser. No. 16/360,514 filed Mar. 21, 2019, which claims priority to Japanese Patent Application No. 2018-218099 filed on Nov. 21, 2018, the entire contents of which is incorporated herein by reference.

TECHNICAL FIELD

The present disclosure relates to a holder for conveyance of a cylindrical body.

BACKGROUND ART

A cylindrical battery has a bottomed cylindrical outer can, and an electrode body and a non-aqueous electrolyte are housed in the outer can. In a manufacturing process for the cylindrical battery, a positive electrode and a negative electrode are coiled with a separator interposing therebetween to produce the electrode body, and the electrode body is inserted into the outer can. The partially finished battery having the electrode body inserted in the outer can is inserted into a cylindrical holder for conveyance and successively conveyed to a post-process, such as a welding step and a liquid injection step, with a conveyer while maintaining a standing posture (Patent Literature 1 to 3).

For example, in a cylindrical non-aqueous electrolyte secondary battery, metal leads are joined to a positive electrode and a negative electrode. A positive electrode lead is drawn from one axial end surface of the electrode body and a negative electrode lead is drawn from the other end surface of the electrode body. The negative electrode lead is bent along the end surface of the electrode body, and the electrode body is inserted into the outer can such that the negative electrode lead faces the bottom surface of the outer can. Meanwhile, the positive electrode lead is drawn from the opening of the outer can.

In the cylindrical battery, the positive electrode lead is joined to the end on the winding start side or the intermediate portion of the positive electrode. In either case, the positive electrode lead is drawn from a portion other than the center of the end surface of the electrode body. Therefore, it is necessary to position the partially finished battery so as to fix the position of the positive electrode lead with respect to an assembly device.

Patent Literature 1 describes providing a step in a part of the outer circumferential surface of a holder for conveyance and engaging the step with a carrier slope provided in a conveyance path to position the holder for conveyance. In that case, it is possible to position a battery with respect to an assembly device with the holder for conveyance taken as a reference.

Patent Literature 2 describes a holder for conveyance formed with an elastic inner wall portion that is disposed with respect to the inner circumferential surface of an outer wall tubular body via a clearance, and a battery holding portion formed swelling inward from the elastic inner wall portion. The inner circumferential surface of the battery holding portion serves as a battery holding surface for holding a cylindrical battery. With this configuration, the battery is stably held in the holder for conveyance.

Patent Literature 3 describes a holder for conveyance in which an iron ring having a larger specific gravity than that of synthetic resin is embedded near the bottom surface of a tubular body portion formed of the synthetic resin so that the center of gravity is positioned in a lower part. With this configuration, the holder for conveyance being conveyed with a conveyer can be prevented from falling down.

CITATION LIST

Patent Literature

Patent Literature 1: JP 8-7855 A
Patent Literature 2: JP 10-80891 A
Patent Literature 3: JP 8-185844 A

SUMMARY

Technical Problem

The holder for conveyance described in Patent Literature 2 can stably hold the outer can by using elastic deformation due to expansion and contraction of the elastic inner wall portion and the battery holding portion at the time of insertion of the outer can. However, both ends of the elastic inner wall portion, which are disposed with the clearance present between the inner circumferential surface of the outer wall tubular body and the elastic inner wall portion, are fixed to the outer wall tubular body, so that it is difficult to ensure displacement of the elastic inner wall portion and the battery holding portion in an outer-diameter direction. Since the outer diameters of the outer cans have certain variations, when the outer can with a large diameter is inserted into the holder for conveyance in the process of mass production of the battery, the battery holding portion may be damaged due to scraping by the outer can or other reasons. As thus described, the holder for conveyance which uses elastic expansion and contraction of the elastic inner wall portion and the battery holding portion has a problem of deterioration in a force to hold the outer can by the battery holding portion caused by accumulated damages associated with insertion and removal of the outer can.

Solution to Problem

A holder for conveyance according to one aspect of the present disclosure is provided with: a tubular portion having a hollow portion in which a cylindrical body is housed; and a protrusion having a base end connected to an inner wall surface of the tubular portion and a distal end formed as a free end, and the protrusion has elasticity and flexibility, and the protrusion has elasticity and flexibility, and the protrusion is disposed on an inner diameter side of an outer circumferential surface of the cylindrical body at an expected housing position such that a side surface of the distal end of the protrusion is allowed to come into contact with the outer circumferential surface while the protrusion is warped to an outer diameter side of the hollow portion.

Advantageous Effects of Invention

According to the holder for conveyance in one aspect of the present disclosure, at the time of insertion of a bottomed cylindrical outer can of a cylindrical battery being an example of the cylindrical body, the protrusion having elasticity and flexibility is warped and deformed in an outer-diameter direction of the hollow portion, and the side surface of the protrusion comes into contact with the outer can. At that time, the side surface of the protrusion is urged to the outer can by a restoring force based on an elastic force of the protrusion, to hold the outer can. As thus described, using the warp of the protrusion with elasticity makes it possible to ensure displacement of the protrusion in the outer-diameter direction. Hence variations in the outer diameter of the inserted outer can may be sufficiently absorbed, thereby preventing damage on the holder for conveyance associated with insertion and removal of the outer can. As a result, a force to hold the outer can by the holder for conveyance is maintained over a long period.

DESCRIPTION OF EMBODIMENTS

Hereinafter, an embodiment according to the present disclosure will be described in detail with reference to the accompanying drawings. In the description, specific shapes, materials, numeral values, directions, and the like are examples for facilitating understanding of the present disclosure and can be changed as appropriate in accordance with the use, purpose, specification, or the like. In addition, when a plurality of embodiments, modified examples, and the like are included in the following, the use of those characteristic portions in appropriate combination has been assumed from the beginning.

Figure 1:
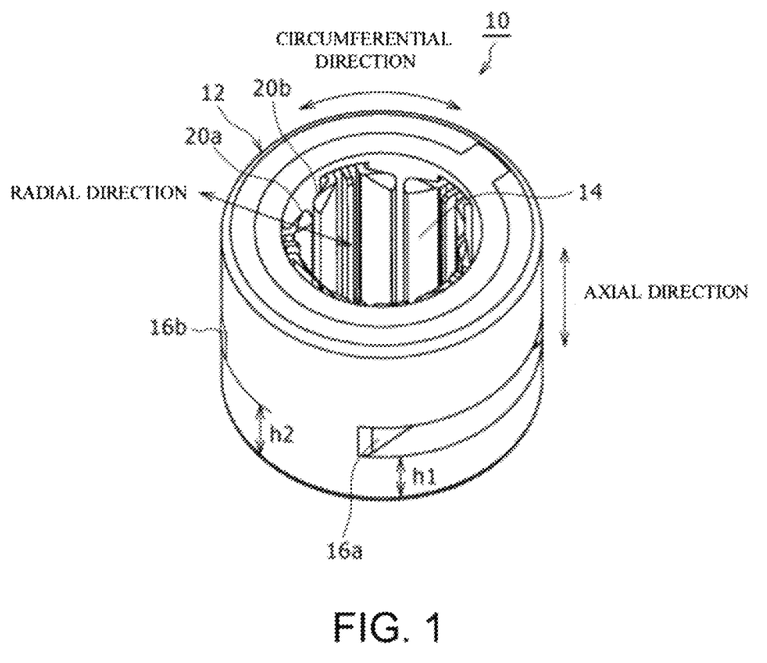
FIG. 1 is a perspective view of a holder for conveyance which is an embodiment of the present disclosure.
Figure 2:
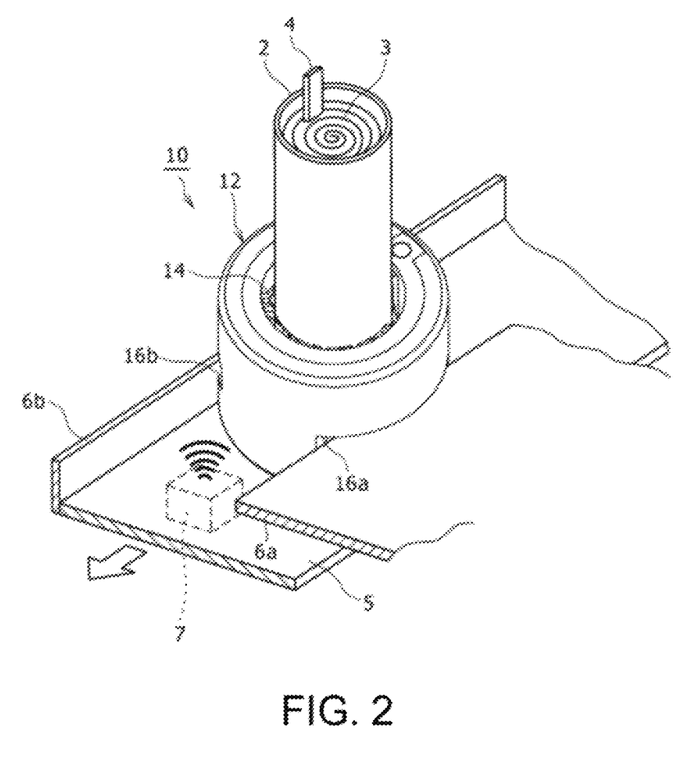
FIG. 2 is a view illustrating a configuration example in which an outer can is held by the holder for conveyance in FIG. 1.

FIG. 1 is a perspective view of a holder 10 for conveyance which is an embodiment of the present disclosure. FIG. 2 is a view illustrating a configuration example in which an outer can 2 is held by the holder 10 for conveyance in FIG. 1. As illustrated in FIGS. 1 and 2, the holder 10 for conveyance of a cylindrical body is provided with a tubular portion 12 forming a cylindrical shape. The tubular portion 12 has a hollow portion 14 on the inner diameter side. The hollow portion 14 is a substantially columnar space, and as illustrated in FIG. 2, the lower end side of the bottomed cylindrical outer can 2 of a cylindrical battery being an example of the cylindrical body is housed and held.

The tubular portion 12 is, for example, formed of a resin material having elasticity except for a ring member and a radio frequency identification (RFID) tag to be described later. For the resin material, for example, polypropylene (PP), Viton, ethylene-propylene-diene rubber (EPDM), polyethylene terephthalate (PET), or the like can be used. These resin materials are preferably used as being easy to mold and having resistance to an electrolyte (organic solvent) used for a second battery.

The outer circumferential surface of the tubular portion 12 is formed of a pair of grooves 16a, 16b. On both sides of the tubular portion 12 in its diameter direction, the pair of grooves 16a, 16b are respectively formed along a tangential direction of the outer circumferential surface of the tubular portion 12 forming a columnar shape. The bottom surfaces (rear-side wall surfaces) of the respective grooves 16a, 16b are formed parallel to each other (cf. FIG. 3). In the present embodiment, the groove 16a is formed at a position of a height h1 from the lower end of the tubular portion 12, and the groove 16b is formed at a position of a height h2 (h2>h1, here) from the lower end of the tubular portion 12. Only one of the grooves 16a, 16b may be formed, but forming the grooves 16a, 16b at positions of mutually different heights enables a change in position of a positive electrode tab 4 in accordance with an assembly device. However, this is not restrictive, and the bottom surfaces of the grooves 16a, 16b may be formed at right angles with each other.

As illustrated in FIG. 2, the holder 10 for conveyance is conveyed with a belt conveyer 5, while the lower-end-side portion of the outer can 2 is housed in the hollow portion 14. At this time, a guide plate 6a is in the state of being fitted in the groove 16a, and a guide plate 6b is disposed so as to face the side surface of the holder 10 for conveyance on the opposite side to the groove 16a. The holder 10 for conveyance is thereby conveyed with the belt conveyer 5, with its rotation in a regulated state. As a result, it is possible to accurately determine the circumferential position of the positive electrode tab 4 protruding from the upper end surface of an electrode body 3 housed in the outer can 2, and thereby to reliably perform am automatic welding step in which the positive electrode tab 4 is welded on a sealing plate, not illustrated. With a plurality of assembly devices being arranged along the belt conveyer 5, in some of the assembly devices, the position of the positive electrode tab 4 illustrated in FIG. 2 may preferably be inverted along the circumferential direction of the holder 10 for conveyance. In that case, the guide plate 6a may be fitted into the groove 16b instead of the groove 16a by adjusting the position of the height of the guide plate 6a.

As illustrated in FIG. 2, a reader-writer device 7 is disposed on the lower side of the belt conveyer 5. The reader-writer device 7 has a function to read individual identification information from the RFID tag built in the holder 10 for conveyance and a function to write the information into the RFID tag.

When an electromagnetic wave is transmitted from the reader-writer device 7 via the belt conveyer 5, and the RFID tag of the holder 10 for conveyance, having received the electromagnetic wave, transmits previously stored individual identification information. By the reader-writer device 7 receiving this transmission, it is possible to specify which holder 10 for conveyance has passed through the position of the reader-writer device 7. The individual identification information of the holder 10 for conveyance, having been read in the above manner, is stored into a storage unit, not illustrated, in association with individual identification information of a cylindrical battery that is manufactured while being conveyed by the holder 10 for conveyance and can be used for follow-up survey or the like as described later. A detail of the RFID tag will be described later.

In the above, the case has been described where the reader-writer device 7 transmits and receives electromagnetic waves via the belt conveyer 5, but this is not restrictive.

The belt conveyer may be made up of two belts with thin widths, the belts may be arranged with a gap formed therebetween, and the reader-writer device 7 may be installed in this gap. This enables more reliable transmission and reception of electromagnetic waves.

Figure 3:
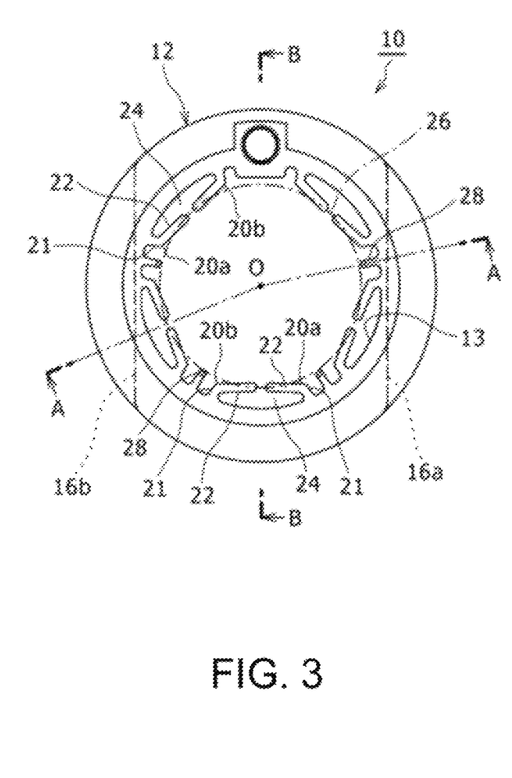
FIG. 3 is a plan view of the holder for conveyance illustrated in FIG. 1, as viewed from an axial direction.
Figure 4:
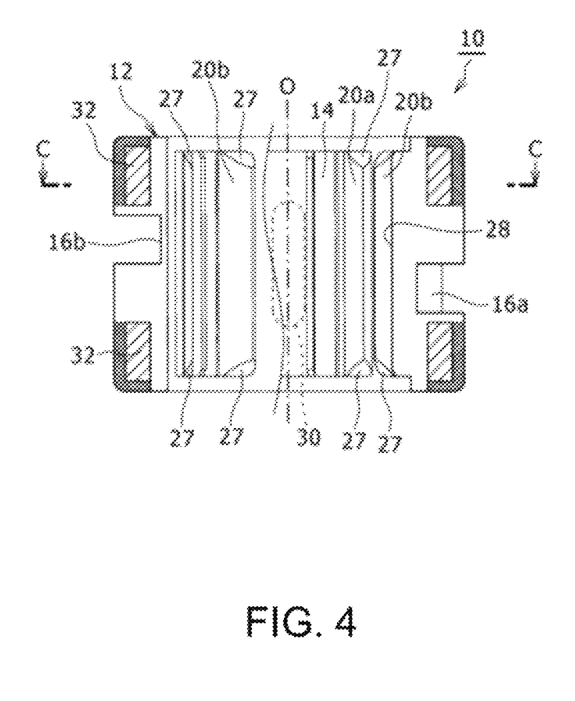
FIG. 4 is a sectional view along a line A-A in FIG. 3.

FIG. 3 is a plan view of the holder 10 for conveyance illustrated in FIG. 1, as viewed from an axial direction. FIG. 4 is a sectional view along a line A-A in FIG. 3. FIGS. 3 and 4 illustrate a central axis O of the tubular portion 12 forming the cylindrical shape.

As illustrated in FIGS. 3 and 4, in the holder 10 for conveyance, protrusions 20a, 20b are formed on the inner wall surface of the tubular portion 12. The protrusions 20a, 20b are formed in a plurality of positions of the inner wall surface 13 in the circumferential direction of the tubular portion 12. Each of the protrusions 20a, 20b has a base end 21 and a distal end 22. In each of the protrusions 20a, 20b, the base end 21 is connected to the inner wall surface 13 of the tubular portion 12, and the distal end 22 is formed as a free end.

The protrusions 20a, 20b are formed integrally with the tubular portion 12 by being molded with the resin material, for example. Each of the protrusions 20a, 20b is formed into a strip shape along the axial direction of the tubular portion 12. Each of the protrusions 20a, 20b has a bent portion between the base end 21 and the distal end 22. The base end 21 protrudes radially inward from the inner wall surface 13 of the tubular portion 12, and the distal end 22 is bent along the substantially circumferential direction via the bent portion.

The protrusion 20a and the protrusion 20b formed in adjacent positions in the circumferential direction of the tubular portion 12 have bent portions bent in directions opposite to each other. The protrusion 20a and the protrusion 20b are in positions with the distal ends thereof close to each other and constitute a pair. The present embodiment represents an example in which five pairs of the protrusions 20a, 20b are formed.

The number of pairs of the protrusions 20a, 20b can be set as appropriate in accordance with the diameter of the cylindrical body being held, the weight of the cylindrical battery, or the like. The protrusions may not constitute a pair, and the number of protrusions is not necessarily two or more.

Each of the protrusions 20a, 20b has elasticity and flexibility. A gap 24 is formed between the distal end 22 of each of the protrusions 20a, 20b and the inner wall surface of the tubular portion 12. The inner-diameter-side side surface of the distal end 22 of each of the protrusions 20a, 20b is disposed on the inner diameter side of the outer circumferential surface of the outer circumferential surface of the outer can 2 in the expected housing position 26. The expected housing position 26 of the outer can 2 is located on a concentric circle of the hollow portion 14. Thereby, when the outer can 2 is inserted into the hollow portion 14, the distal end 22 of each of the protrusions 20a, 20b can be warped to the outer diameter side, and the outer circumferential surface of the outer can 2 is urged by elasticity of each of the protrusions 20a, 20b, so that the outer can 2 can be held. When the outer can 2 is taken out of the holder 10 for conveyance, the protrusions 20a, 20b can be elastically returned to the original positions.

An inclined surface 27 is formed at an inner-diameter-side corner of each of both axial ends of the protrusions 20a, 20b. The inclined surface 27 may be inclined such that its axial position is more inward toward the radial inside. When the outer can 2 is inserted into the hollow portion 14 of the tubular portion 12, the inclined surface 27 comes into contact with the rim of the bottom of the outer can 2 to function as a guide surface for guiding to the central axis O side of the tubular portion 12. Note that the inclined surface 27 may be formed at only one axial end (e.g., the upper end when the holder 10 for conveyance is in use) of each of the protrusions 20a, 20b.

A plurality of (four in the present embodiment) auxiliary protrusions 28 are arranged between the pair of protrusions 20a, 20b. The auxiliary protrusion 28 is formed protruding radially inward from the inner wall surface 13 of the tubular portion 12. The auxiliary protrusion 28 has a strip shape formed by extending along the axial direction. The inner-diameter-side end of the auxiliary protrusion 28 closely faces the outer circumferential surface of the expected housing position 26 of the outer can 2. Inclined surfaces are also formed at both axial ends of the auxiliary protrusion 28 in the same manner as the protrusions 20a, 20b. By forming such auxiliary protrusions 28, it is possible to perform a function to loosely position the outer can 2 so that the outer can 2 is brought closer to the central axis O side of the tubular portion 12 when inserted into the hollow portion 14. Note that the auxiliary protrusion is not an essential constituent in the holder for conveyance in the present disclosure, and may be omitted when the positioning performed by a plurality of pairs of protrusions 20a, 20b functions sufficiently.

According to the holder 10 for conveyance with the above configuration, at the time of insertion of the bottomed cylindrical outer can 2 of the cylindrical battery, the protrusions 20a, 20b having elasticity and flexibility are warped and deformed in the outer-diameter direction of the hollow portion 14, and the inner-diameter-side side surface of the protrusion comes into contact with the outer can 2. At that time, the side surfaces of the protrusions 20a, 20b are urged to the outer can 2 by restoring forces based on elastic forces of the protrusions 20a, 20b, to hold the outer can. As thus described, using the warp of each of the protrusions 20a, 20b with elasticity makes it possible to ensure displacement of each of the protrusions 20a, 20b in the outer-diameter direction. Hence variations in the outer diameter of the inserted outer can 2 can be sufficiently absorbed, thereby preventing damage on the holder 10 for conveyance associated with insertion and removal of the outer can 2. As a result, a force to hold the outer can 2 by the holder 10 for conveyance is maintained over a long period.

Further, in the holder 10 for conveyance in the present embodiment, the protrusion 20a and the protrusion 20b formed in adjacent positions in the circumferential direction of the tubular portion 12 have bent portions bent in directions opposite to each other. Therefore, when the outer can 2 is inserted into the tubular portion 12 and held in each of the protrusions 20a, 20b, the direction in which the outer can 2 is urged to the outer circumferential surface by the distal end 22 of the protrusion 20a and the direction in which the outer can 2 is urged to the outer circumferential surface by the distal end 22 of the protrusion 20b intersect with each other at an acute angle. As a result, the rotation of the outer can 2 in the tubular portion 12 can be effectively prevented, and the central axis of the outer can 2 is easily positioned so as to match the central axis O of the tubular portion 12, thereby improving the alignment accuracy.

Figure 5:
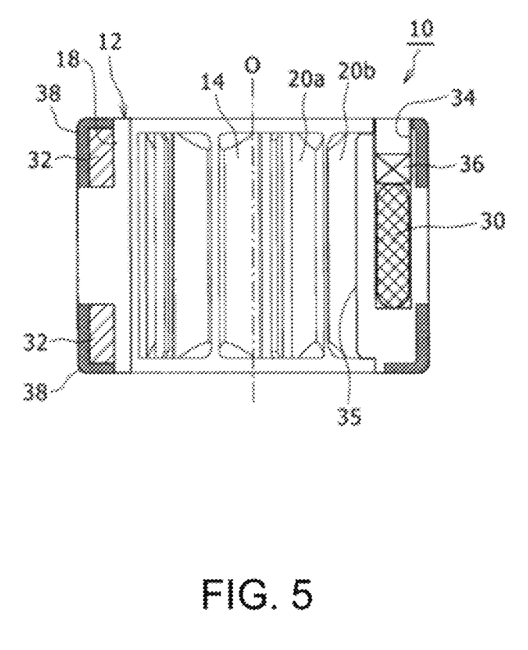
FIG. 5 is a sectional view along a line B-B in FIG. 3.
Figure 6:
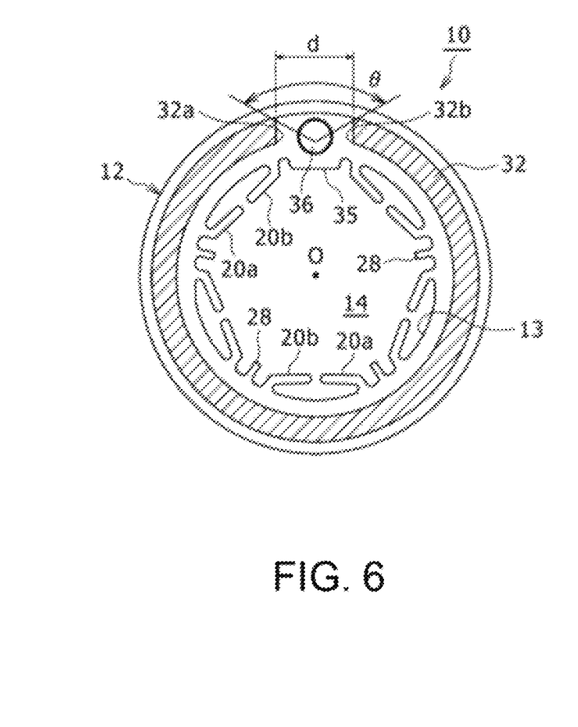
FIG. 6 is a sectional view along a line C-C in FIG. 4.

Next, an RFID tag 30 and a ring member 32 of the holder 10 for conveyance will be described with reference to FIGS. 5 and 6. FIG. 5 is a sectional view along a line B-B in FIG. 3. FIG. 6 is a sectional view along a line C-C in FIG. 4.

As illustrated in FIGS. 5 and 6, the holder 10 for conveyance further includes the RFID tag 30 and the ring member 32. The RFID tag 30 and the ring member 32 are embedded in the tubular portion 12.

The RFID tag 30 is embedded in one circumferential point in the tubular portion 12. In the tubular portion 12, a bottomed tag mounting hole 34 is provided by drilling from the axial end surface. In order to ensure the thickness for forming the tag mounting hole 34, in a position corresponding to the tag mounting hole 34 on the inner wall surface 13 of the tubular portion 12, an overlay portion 35 is formed swelling to the inner diameter side.

The RFID tag 30 is disposed at the bottom of the tag mounting hole 34. After insertion of the RFID tag 30 into the tag mounting hole 34, the tag mounting hole 34 is closed with a plug 36 formed by hot-melt resin. Thereby, the RFID tag 30 is fixed in the tag mounting hole 34 so as not to fall off the holder 10 for conveyance.

In the holder 10 for conveyance in the present embodiment, two ring members 32 are embedded respectively on the inside near the upper end of the tubular portion 12 and on the inside near the lower end of the tubular portion 12. As illustrated in FIG. 6, the ring member 32 has a C-shape in a plan view and is disposed extending circumferentially on the inside near the outer circumferential surface of the tubular portion 12. As illustrated in FIG. 5, the outer circumferential surface and the axial end surface of the ring member 32 are covered with a molded resin portion 38. The molded resin portion 38 is formed over the entire circumference of the tubular portion 12. Note that the ring member 32 is not necessarily restricted to the case of forming the C-shape, but may be configured by being divided into a plurality of sections in the circumferential direction, for example.

As illustrated in FIG. 6, the ring member 32 has two end surfaces 32a, 32b, and is disposed such that the RFID tag 30 is located in a position between the two end surfaces 32a, 32b. A memory is built in the RFID tag 30, the memory being capable of reading and writing individual identification information such as a number of the holder 10 for conveyance. The RFID tag 30 is readable and writable in a contactless manner by the reader-writer device 7 (cf. FIG. 2) installed outside. The reader-writer device 7 can be disposed to be able to read the RFID tag 30 from below the holder 10 for conveyance which is a reading target. However, the reader-writer device is not restricted thereto, but may be disposed above the holder 10 for conveyance and read information from the RFID tag 30.

Providing the RFID tag 30 in the holder 10 for conveyance enables high-quality management in the manufacturing process. Further, by previously recording the individual identification information of the holder 10 for conveyance in association with a lot number printed on a cylindrical battery manufactured using the holder 10 for conveyance, the history in the manufacturing process can be followed even for the battery after shipment.

Patent Literature 3 describes the holder for conveyance in which a number storage device is built along with the iron ring. However, in the RFID system, in the case of reading the RFID tag in a contactless manner from the external reader-writer device by using an electromagnetic wave, there has been a problem of erroneously reading the RFID tag of the holder for conveyance adjacent to the holder for conveyance which is the reading target. Further, when the iron ring is embedded in the holder for conveyance, the reading and writing of the RFID tag by the reader-writer device may be inhibited due to an influence of an eddy current generated by the iron ring. In Patent Literature 3, no consideration was made for such a problem.

In the present embodiment, as illustrated in FIG. 6, the RFID tag 30 and the C-shaped ring member 32 are disposed on the same circle inside the holder 10 for conveyance. The RFID tag 30 is, for example, sealed inside a glass tube and preferably disposed within a range where an antenna built in the RFID tag 30 is surrounded by an inscribed circle and a circumscribed circle of the ring member 32.

A ferromagnetic body is preferably used for the ring member 32, and for example, a ferromagnetic body containing iron can be used. In addition, the ring member 32 is not restricted to the ferromagnetic body, but a conductive material such as metal may be used. The electromagnetic wave is shielded by the ring member 32, so that the directions in which the RFID tag 30 can be read and written by the reader-writer device 7 are restricted, thereby preventing erroneous reading of the RFID tag 30.

When an interval d between the circumferential end surfaces 32a, 32b of the C-shaped ring member 32 is excessively small, the accuracy in reading of the RFID tag 30 by the reader-writer device may deteriorate. The interval d between the end surfaces 32a, 32b of the ring member 32 is preferably 5 mm or larger, and more preferably 8 mm or larger. Further, the ring member 32 is preferably not provided present between the RFID tag 30 and the outer circumferential surface of the holder 10 for conveyance in a range where an angle θ is 100° or larger, the angle θ being between lines connecting the central axis of the RFID tag 30 which is parallel to the axial direction of the holder 10 for conveyance and the outer circumferential side edges of the end surfaces 32a, 32b of the C-shaped ring member 32. This can further enhance the accuracy in reading of the RFID tag 30 by the reader-writer device. A similar effect can be exerted also when the RFID tag 30 and the ring member 32 are applied to a known holder for conveyance. That is, the RFID tag 30 and the ring member 32 can be applied to the holder for conveyance limitlessly as long as the holder for conveyance having a tubular portion for housing a cylindrical body is used. In that case, the holder for conveyance preferably has means for holding a cylindrical body, and the means are not restricted.

The holder 10 for conveyance in the present embodiment can be produced by molding processing of the resin material such as polypropylene. The holder 10 for conveyance can also be produced in such a manner that a plurality of parts, produced by the molding processing of the resin material, are integrated by joint molding. In that case, a border line between each part is preferably coated by molding the entire surface of the integrated molded matter with the resin material. As a method of producing the holder 10 for conveyance, cutting processing can also be used in addition to the molding processing of the resin material.

Figure 7:
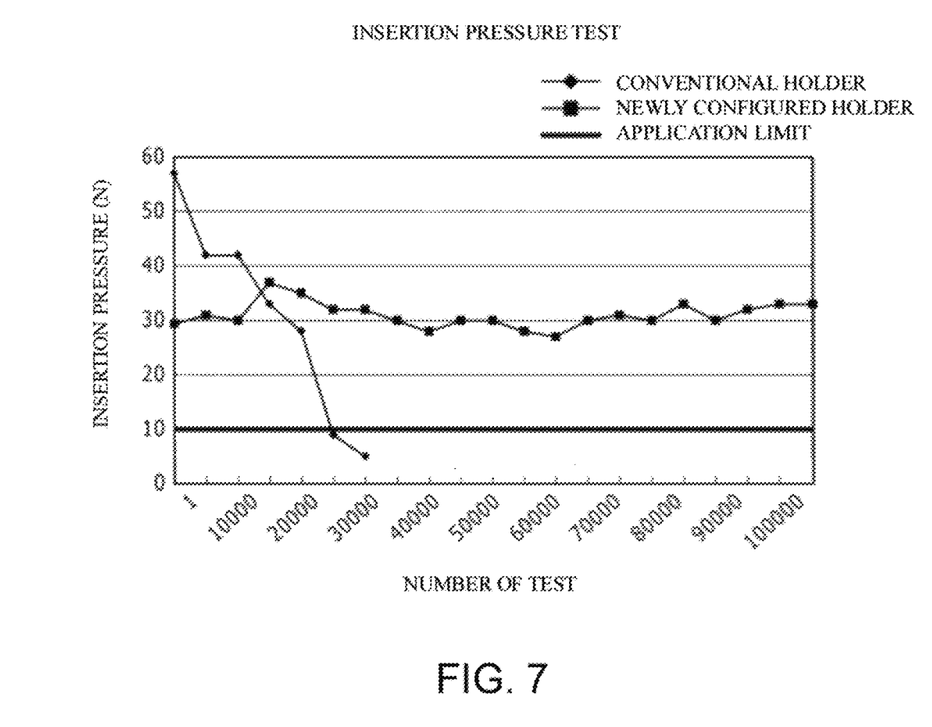
FIG. 7 is a graph illustrating results of conducting an insertion pressure test of a cylindrical battery concerning the holder for conveyance in the present embodiment and the holder for conveyance in the conventional example (Patent Literature 2)

FIG. 7 is a graph illustrating results of conducting an insertion pressure test of a cylindrical battery concerning the holder 10 for conveyance in the present embodiment and the holder for conveyance in the conventional example (Patent Literature 2). In the graph in FIG. 7, a horizontal axis indicates the number of tests of insertion into the holder for conveyance, and a vertical axis indicates insertion pressure (N). Further, in FIG. 7, an application limit is indicated by a thick line. The application limit here can be the lower limit for insertion pressure to prevent the occurrence of inadvertent fall of the outer can off the holder for conveyance and the rotation of the cylindrical battery in the holder for conveyance in the process of manufacturing.

As illustrated in FIG. 7, in the holder for conveyance in the conventional example, sufficient insertion pressure is exerted at the beginning of the test, but the insertion pressure then drops sharply, resulting in falling below the application limit around the 25000 times of battery insertion. In contrast, in the holder 10 for conveyance in the present embodiment, it has been found that, although the insertion pressure at the beginning of the test is lower than that in the holder for conveyance in the conventional example, a value sufficiently higher than the application limit can be obtained. Further, in the holder 10 for conveyance in the present embodiment, the insertion pressure almost remains unchanged even when the number of tests exceeds 100 thousand times, and it can be confirmed that the durability improves significantly as compared to the holder for conveyance in the conventional example.

Note that the holder for conveyance of the cylindrical body according to the present disclosure is not restricted to the embodiment and its modified example, but various changes and modifications can be made within the scope of the description in the claims of the present application.

Figure 8:
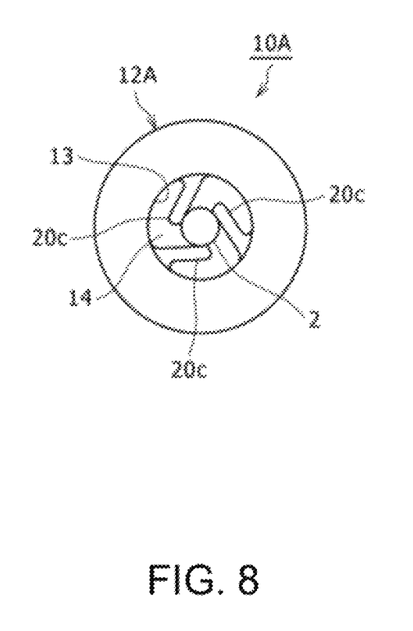
FIG. 8 is a view illustrating a modified example of the holder for conveyance.

The example has been described above where the protrusion 20a and the protrusion 20b being circumferentially adjacent on the inner wall surface of the tubular portion 12 are formed in the shapes of being bent in the directions opposite to each other, but this is not restrictive. For example, as illustrated in FIG. 8, in a holder 10A for conveyance, for example, three protrusions 20c may be formed protruding from the inner wall surface 13 of a tubular portion 12A, and the inner-diameter-side side surface of the protrusion 20c may be urged to the outer circumferential surface of the outer can 2 of the cylindrical battery, to hold the outer can 2. In this case, each protrusion 20c is formed in a strip shape extending along the axial direction, has no bent portion, and is formed linearly extending from the base end to the distal end. In addition, each protrusion 20c is preferably provided in circumferentially uniform arrangement on the inner wall surface 13 of the tubular portion 12A.

Figure 9:
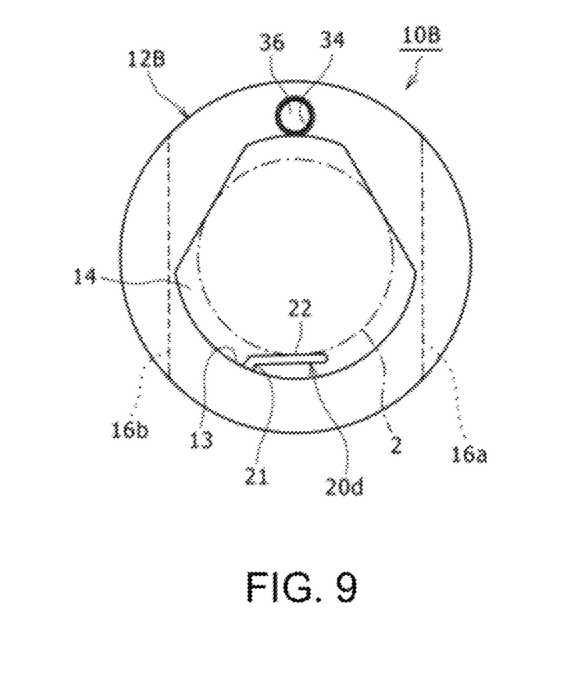
FIG. 9 is a view illustrating another modified example of the holder for conveyance.

The configuration has been described above where the plurality of protrusions 20a, 20b hold the outer can 2, but this is not restrictive. For example, as illustrated in FIG. 9, it may be configured such that the outer can 2 is held by one protrusion 20d formed on the inner wall surface 13 of a tubular portion 12B. In this case, the protrusion 20d has the base end 21 connected to the inner wall surface and the distal end 22 bent from the base end 21 via the bent portion, and the inner-diameter-side side surface of the distal end 22 urges the outer circumferential surface of the outer can 2. Further, in this case, the inner wall surface 13 of the tubular portion 12B forms an arc shape instead of a cylindrical shape in a region where the protrusion 20d is formed, but in the other region, the inner wall surface 13 is formed having a substantially V-shape including two linear portions, and the outer circumferential surface of the outer can 2 urged by the protrusion 20d is pressed-fit by the two linear portions on the inner wall surface 13. Thereby, in the modified example illustrated in FIG. 9, a holder 10B for conveyance stably holds the outer can 2 with one protrusion 20d.

REFERENCE SIGNS LIST 2 outer can (cylindrical body), 3 electrode body, 4 positive electrode tab, 5 belt conveyer, 6a/6b guide plate, 7 reader-writer device, 10/10A/10B holder for conveyance, 12/12A/12B tubular portion, 13 inner wall surface, 14 hollow portion, 16a/16b groove portion, 35 overlay portion, 20a/20b/20c/20d protrusion, 21 base end, 22 distal end, 24 gap, 26 expected housing position, 27 inclined surface, 28 auxiliary protrusion, 30 RFID tag, 32 ring member, 32a/32b end surface of ring member, 34 tag mounting hole, 36 plug, 38 molded resin portion, O central axis, d interval, θ angle

The invention claimed is:

1. A holder for conveyance, comprising:
a tubular portion having a hollow portion in which a cylindrical body is housed; and
a radio frequency identification (RFID) tag and a ring member both embedded in the tubular portion,
wherein the ring member includes a ferromagnetic body, and
wherein in a plan view taken in an axial direction of the tubular portion, the ring member comprises a substantially annular shape that has at least one discontinuity along a circumference thereof, and the RFID tag and the ring member are concyclically positioned.

2. The holder for conveyance according to claim 1, wherein the ring member has a C-shaped configuration in the plan view taken in the axial direction of the tubular portion.

3. The holder for conveyance according to claim 1, wherein the ferromagnetic body is iron.

4. The holder for conveyance according to claim 1, wherein an antenna built in the RFID tag is surrounded by an inscribed circle and a circumscribed circle of the ring member.

5. The holder for conveyance according to claim 1, wherein a gap between opposing end surfaces across the at least one discontinuity of the ring member is 5 mm or greater.

6. The holder for conveyance according to claim 1, wherein the ring member is not interposed between the RFID tag and an outer circumferential surface of the tubular portion in a range enclosed with a pair of lines each connecting a central axis of the RFID tag parallel to the axial direction to outer circumferential side edges of opposing end surfaces across the at least one discontinuity of the ring member, wherein an angle θ between the pair of lines is 100° or more.

* * * * *